United States Patent
Hanson

Patent Number: 5,935,503
Date of Patent: Aug. 10, 1999

[54] PROCESS AND KIT FOR CREATING ARTIFICIAL LEAVES AND FLOWERS

[75] Inventor: Susan Hanson, Long Beach, N.Y.

[73] Assignee: Natural Science Industries, Ltd., West Hempstead, N.Y.

[21] Appl. No.: 08/958,013

[22] Filed: Oct. 27, 1997

[51] Int. Cl.⁶ .................................................. B29C 39/10
[52] U.S. Cl. ............................ 264/275; 264/279; 425/2; 425/112; 425/470; 206/575; 249/55; 249/96
[58] Field of Search ................................ 425/2, 112, 470, 425/DIG. 38, DIG. 130, DIG. 239, DIG. 240; 249/55, 96, 97, 117, 134; 52/743; 206/575; 264/275, 279

[56] References Cited

U.S. PATENT DOCUMENTS

| | | | |
|---|---|---|---|
| 2,467,567 | 4/1949 | Owens et al. | 156/267 |
| 2,684,503 | 7/1954 | Silver | 249/55 |
| 2,697,892 | 12/1954 | Haas | 41/13 |
| 2,793,454 | 5/1957 | Shoemaker | 41/10 |
| 2,903,942 | 10/1959 | Basco | 18/59 |
| 3,146,153 | 8/1964 | Stein | 161/30 |
| 4,293,997 | 10/1981 | Lee | 29/450 |
| 4,407,766 | 10/1983 | Haardt et al. | 249/117 |
| 4,409,768 | 10/1983 | Boden | 52/743 |
| 5,580,507 | 12/1996 | Williamson et al. | 249/112 |

Primary Examiner—Robert Davis
Assistant Examiner—Mark Wentink
Attorney, Agent, or Firm—Schweitzer Cornman Gross & Bondell LLP

[57] ABSTRACT

A method and apparatus for the forming of artificial leaves and flower petals, especially for use as a craft item, includes a male form for forming an armature for the leaf or petal and a female mold for generating the leaf or petal body. A flexible wire is wrapped about the male form to form an armature with an extending stem. The armature is removed from the form and placed in the mold. The mold is then filled with a film-forming casting material, such as a polyvinyl acetate. Upon cure, the artificial leaf or petal is removed from the mold. The leaf or petal may be combined with other leaves or petals similarly formed to form an artificial floral arrangement.

13 Claims, 2 Drawing Sheets

PROCESS AND KIT FOR CREATING
ARTIFICIAL LEAVES AND FLOWERS

The present invention relates to a new and improved process, particularly suited for children's crafts, for the creation of artificial petals and leaves which may be subsequently assembled to create attractive and long-lasting artificial floral-type arrangements.

BACKGROUND OF THE INVENTION

The creation of artificial flowers and leaves is well known. The prior art teaches, for example, the pressing of individual leaves and petals from sheet-like material, which petals and leaves are subsequently interconnected and joined as desired. It is also known to utilize a wire-like armature to provide the appearance of a vein within a leaf and to provide a stem-like armature. Various materials and compounds, including liquid plastic formulations, have been utilized for molding. Often, however, such compounds are flammable and/or hazardous, thus limiting their use, particularly for craft or hobby sets intended for home use.

It is accordingly a purpose of the present invention to provide a method and apparatus for the creation of artificial petals and leaves which utilizes non-hazardous or flammable materials.

Yet another purpose of the present invention is to provide such a method and apparatus which is of simple, yet efficient means.

Still another purpose of the present invention is to provide an apparatus for carrying out the aforementioned purposes which is of simple, yet resilient construction.

A still further purpose of the present invention is to provide an apparatus of the foregoing type which can be presented in the form of a kit.

BRIEF DESCRIPTION OF THE INVENTION

In accordance with the foregoing and other objects and purposes, the method of the present invention comprises the formation of a frame constituting the intended exterior shape of the leaf or petal to be modeled by wrapping a flexible yet rigid material about a male form corresponding to the desired outline shape. The frame element is then removed from the form and placed within a female mold similarly corresponding to the desired shape. The female mold retains the frame element therein. A liquid casting substance is then placed in the mold. The casting material sets to a thick film, adhering to the frame material. When set, the thus produced artificial petal or leaf element is removed.

The apparatus by which the process of the present invention may be carried out may include one or more male forms of various peripheral contours, constituting the desired leaf and petal shapes, as well as one or more corresponding female molds to accept the corresponding frame. Casting material, in a plurality of colors may be provided to give variety to the cast designs. Glitter may be mixed into the casting material.

BRIEF DESCRIPTION OF THE DRAWINGS

A fuller understanding of the present invention and the objects and features thereof will be obtained upon consideration of the following detailed description of a preferred, but nonetheless illustrative embodiment of the present invention, when considered in association with the annexed drawings, wherein.

DETAILED DESCRIPTION OF THE INVENTION

Figure 1:
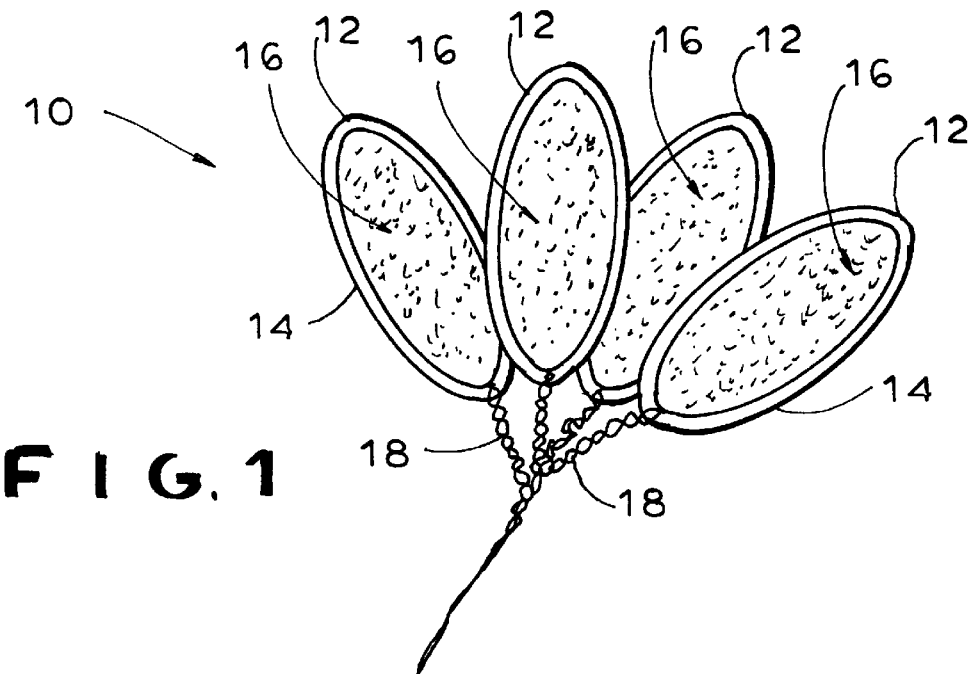
FIG. 1 is an illustration of an arrangement created in accordance with the present invention.

As depicted in the figures, the present invention provides a method and apparatus for creating artificial floral-type products, such as leaf arrangement 10. Arrangement 10 comprises a plurality of individual petals or leaves 12, each of which has a peripheral frame or armature 14 supporting a film-like leaf body 16. Each of the armatures 14 include a stem portion 18, the stem portions being able to be joined together, such as by twisting to join the individual petals or leaves together into an attractive, life-like arrangement as desired by the user.

Figure 2:
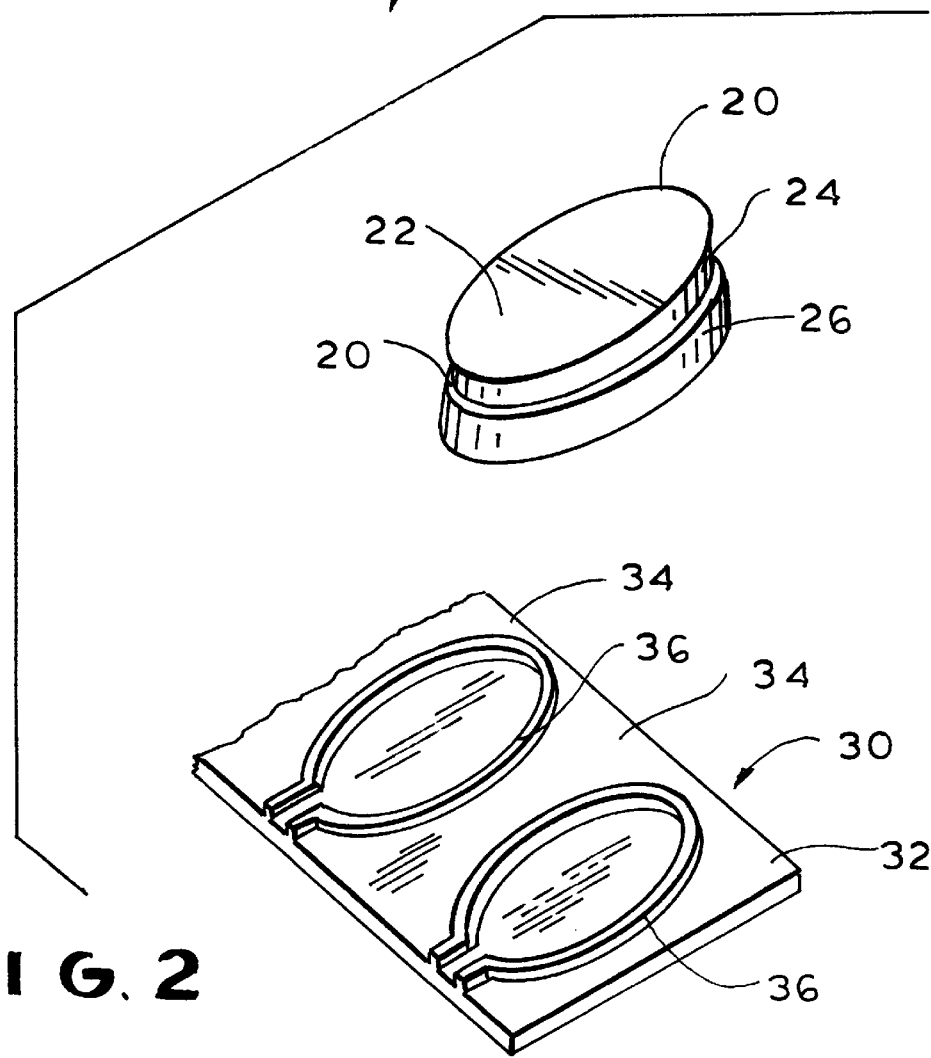
FIG. 2 is a perspective view of a male and a pair of female molds.

Each of the leaves 12 is formed by the wrapping of a length of armature material, which may be thin gauge wire, either coated or uncoated, about a male form. the gauge of the wire is chosen to be easily wrapped about the form but with sufficient rigidity to retain the desired shape of a leaf or petal. As depicted in FIG. 2, the male form 20 includes an upper portion 22 having a vertical side wall 24 in the desired outline shape for the petal or leaf armature to be formed thereon. Base portion 26 includes top horizontal wall 28 which, with side wall 24, forms a shoulder construction against which the armature wire may be wrapped and twisted, the armature wire conforming closely to the contour of the side wall 24.

Figure 3:
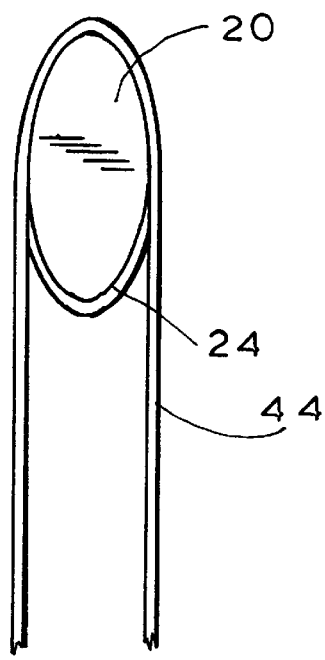
FIG. 3 is a top plan view of a male mold with a frame member placed thereon.
Figure 4:
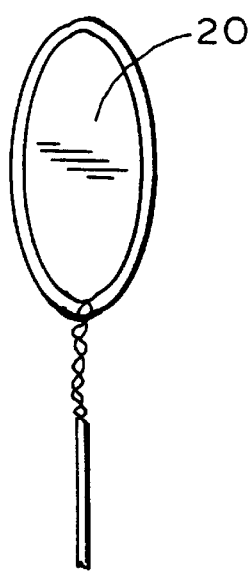
FIG. 4 is a top plan view of a male mold with the frame member wrapped therearound.

As depicted in FIGS. 3 and 4, a chosen length of wire 44 is placed against the side wall 24 and wrapped fully about the form. The free ends of the wire are then twisted together as shown in FIG. 4, drawing the wire snugly about the form and allowing the wire to assume the shape of the form. The formed creation is then slid upwardly along the side wall whereby it is removed from the form.

Figure 5:
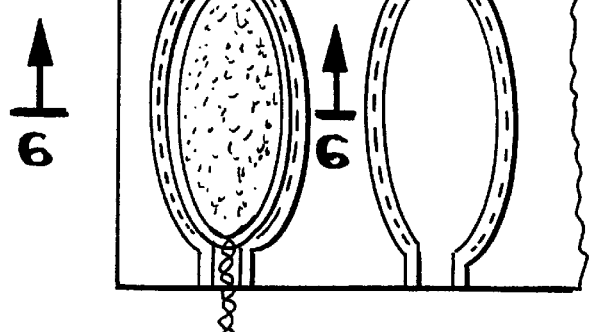
FIG. 5 is a top plan view of the female molds of FIG. 2, illustrating the casting step.
Figure 6:
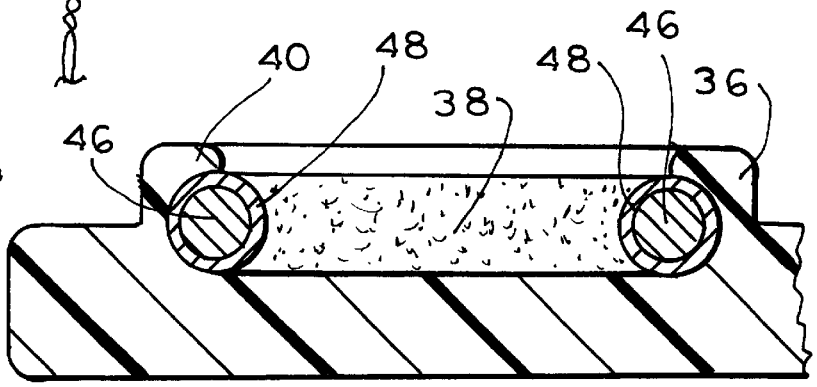
FIG. 6 is a section view taken along line 6—6 of FIG. 5.

The female mold is depicted in FIGS. 2, 5 and 6. As shown therein, female mold unit 30 may comprise an elongated base 32 having a plurality of individual molds 34 thereon. The molds may be of identical or different shapes, allowing a plurality of petals or leaves to be formed. Each of the individual molds has a side wall 36 extending upwardly from and about mold bottom 38. The upper portion of the side wall 36 may terminate within a slightly in-turned lip portion 40.

Each of the individual molds 34 corresponds in shape to a male form 20, and particularly to the shape of an armature 14 as generated on a male form. The armature is placed within a corresponding mold, as depicted in FIGS. 5 and 6, the armature fitting closely against the inner surface of mold side wall 36, and being gently retained within the mold by the in-turned lip 40. Each of the individual molds is provided with a side opening 42 through which the stem 18 of the armature, extending beyond the leaf or petal outline, projects and is supported.

With an armature placed in the appropriate individual mold, a liquid molding material is placed in the mold to form the leaf or petal body. The liquid may preferably be, for example, a non-toxic polyvinyl acetate, which may be colored with an appropriate colorant as known in the art. Typically, such a liquid is highly viscous, and may be applied within the mold by use of a brush. The use of a brush is preferred, as it allows a controlled layer of the liquid material to be built up upon and across the entire mold bottom surface and in contact with the entire periphery of the leaf-forming armature. As shown in FIG. 6, the layer is preferably of a height substantially the same as the height of the armature 14 which is shown as comprising copper wire 46 within an insulating coating 48. Use of insulated wire may be preferred since it allows an increased overall diameter for the wire element at lower cost than an uncoated/ uninsulated wire of the same diameter. Due to the viscous nature of polyvinyl acetate, it is possible to apply a plurality of differently-colored molded materials in differing areas of the mold without significant flow-out and thus mixing of the colors. Glitter may also be incorporated into the polyvinyl acetate material to provide varying effects. In this way multi-colored leaf and petal designs can be created. Polyvinyl acetate is particularly preferred in that it is water soluble when liquid and is generally considered nonhazardous. The female mold is preferably formed of a material, such as polyethylene, to which the polyvinyl acetate does not bond. Thus, when dry the produced leaf or petal may be easily removed from the mold by lifting the armature from the mold. The polyvinyl acetate adheres to the armature as a leaf-forming film, easily peeling away from the mold bottom, producing a well-formed leaf or petal and leaving the mold available for re-use. Both the armature and adhered leaf body 16 have sufficient flexibility to pass the side wall lip 40.

Because of the flexible nature of the armature, and the leaf-forming film, the generated leaf or petal may be further gently bent or formed from the original flat orientation as removed from the mold to a more-natural representation. When grouped together, the resulting artificial floral arrangement, which may include leaves and petals of varying shape and coloration, is particularly life-like and long-lasting.

The elements of the present invention may be advantageously packaged as a kit. Such a kit may include a plurality of male forms of a variety of shapes to create both leaf and petal shapes, and corresponding female molds. A plurality of identical female molds may be included to allow several identical armatures to be cast upon simultaneously. A set of molding compounds of a variety of colors, along with one or more brushes or other applicators, complete the kit, allowing a wide-variety of arrangements to be created.

I claim:

1. A kit for forming artificial leaves and petals, comprising: a length of flexible wire for forming into a peripheral leaf or petal-forming armature and retaining a shape upon forming; a male form having a side wall of a contour corresponding to the perimeter shape of a leaf or petal to be formed, said wire being formed into said peripheral armature by wrapping about said side wall; a female mold having a side wall extending upwardly from a mold bottom forming a chamber to accept the peripheral armature, the side wall of said mold adapted and arranged to abut the armature; and a casting compound for filling said mold within a periphery of the armature and curing to a film-like consistency.

2. The kit of claim 1, wherein said casting compound is a polyvinyl acetate.

3. The kit of claim 2, wherein said mold is of polyethylene.

4. The kit of claim 1, wherein said mold side wall includes a top internal lip and an aperture through which a stem of the armature may extend.

5. The kit of claim 4, wherein said male form comprises a base having an upper horizontal wall, said side wall extending upwardly from said horizontal wall.

6. The kit of claim 1, wherein said wire is a coated wire.

7. A method for forming an artificial leaf or petal, comprising the steps of wrapping a length of flexible wire about a side wall of a male form to form a peripheral leaf or petal-forming armature having an extending stem; removing said armature from the male form and inserting it into a female mold having a side wall adapted and arranged to abut the armature; filling said mold to the level of said armature with a casting compound; allowing said casting compound to cure to a film-like consistency; and removing the artificial leaf or petal from the mold.

8. The method of claim 7, wherein said casting compound is a polyvinyl acetate.

9. A method for forming an artificial leaf or petal, comprising the steps of forming a length of flexible wire into a peripheral armature having the shape of the leaf or petal; placing said armature on a mold means having a bottom surface upon which the armature rests; filling the interior of the armature with a casting compound; allowing said casting compound to cure to a film-like consistency; and removing the filled armature from the mold.

10. A kit for forming artificial leaves and petals comprising a length of flexible wire capable of being formed into a peripheral leaf or petal-forming armature and retaining a shape upon forming; a female mold means having a bottom surface upon which the armature rests; and a casting compound for filling the interior of said armature and curing to a film-like consistency adhering to the armature.

11. A method for forming an artificial leaf or petal, comprising the steps of: placing an armature, the periphery of which is in the shape of the leaf or petal and surrounding an interior space on a mold means having a bottom surface upon which the armature rests; filling the interior space surrounded by the armature with a casting compound; allowing said casting compound to cure to a film-like consistency and adhere to the armature; and removing the armature and the casting compound from the mold.

12. An kit for forming artificial leaves and petals comprising a peripheral leaf or petal forming armature surrounding an interior space; a female mold means having a bottom surface upon which the armature rests; and a casting compound for filling the interior space of said armature and curing to a film-like consistency adhering to the armature.

13. The apparatus of claim 12, wherein said armature is of a material to which said casting compound will adhere.

* * * * *